(12) United States Patent
Konrad et al.

(10) Patent No.: US 6,944,240 B2
(45) Date of Patent: Sep. 13, 2005

(54) METHOD AND CIRCUIT FOR TRANSMITTING A DATA-MODULATED HIGH-FREQUENCY DATA SIGNAL FROM A TRANSMITTER TO A RECEIVER HAVING A SIMPLIFIED RECEIVER ARCHITECTURE

(75) Inventors: Wolfgang Konrad, Moedling (AT); Martin Schiefer, St. Poelten (AT); Peter-Ernst Veith, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 205 days.

(21) Appl. No.: 10/176,529

(22) Filed: Jun. 24, 2002

(65) Prior Publication Data

US 2003/0012304 A1 Jan. 16, 2003

Related U.S. Application Data

(63) Continuation of application No. PCT/DE00/04398, filed on Dec. 11, 2000.

(30) Foreign Application Priority Data

Dec. 22, 1999 (DE) .......................................... 199 62 458

(51) Int. Cl.⁷ ............................ H04L 27/06; H04B 1/38
(52) U.S. Cl. ...................................... 375/316; 455/556
(58) Field of Search ................................ 375/316, 130, 375/147, 51; 455/266, 200.1, 227, 556; 330/151, 149, 298

(56) References Cited

U.S. PATENT DOCUMENTS

| | | | | |
|---|---|---|---|---|
| 4,942,591 A | * | 7/1990 | Nease et al. ................. | 375/330 |
| 6,009,304 A | * | 12/1999 | Kato ........................... | 725/68 |
| 6,259,353 B1 | * | 7/2001 | Berger et al. .............. | 340/10.1 |
| 6,405,025 B1 | * | 6/2002 | Keski-Mattinen ........... | 455/266 |
| 6,535,748 B1 | * | 3/2003 | Vuorio et al. ............ | 455/552.1 |
| 6,584,304 B1 | * | 6/2003 | Thomsen et al. ........ | 455/188.1 |
| 6,662,001 B1 | * | 12/2003 | Roth .......................... | 455/314 |

FOREIGN PATENT DOCUMENTS

| | | |
|---|---|---|
| DE | 37 30 470 A1 | 3/1988 |
| DE | 44 35 241 A1 | 4/1996 |
| JP | 6-164449 | 6/1994 |

OTHER PUBLICATIONS

T P Holden, et al, "A Spread–Spectrum Based Synchronization Technique for Digital Broadcast Systems", IEEE Transactions on Broadcasting, IEEE Inc., vol. 36, No. 3, Sep. 1990, pp. 185–194, New York.

K.K. Lee, et al, "A New Feedforward Tracking System Bandpass Filter for Carrier Recovery Systems", IEEE, International Conference on Communications, vol. –, Jun. 1985, pp. 1010–1014, New York.

F. Davarian, "Mobile Digital Communications Via Tone Calibration", IEEE Transactions on Vehicular Technology, vol. VT–36, No. 2, May 1987, pp. 55–62, New York.

* cited by examiner

*Primary Examiner*—Khai Tran
(74) *Attorney, Agent, or Firm*—Sughrue Mion, PLLC

(57) ABSTRACT

A method and circuit for transmitting a data-modulated high-frequency data signal $f_C$ from a transmitter to a receiver, for transmitting data between a read-write device (RWD) and at least one mobile data memory (MDM) in an identification system that has a number of mobile data memories (MDM) which are placed on objects and which are provided for detecting object-specific status data and/or process data. Such an identification system is particularly useful, e.g., in a shipping, transport and/or manufacturing system of the individual objects. In addition to the transmitted high frequency data signal $f_C$, a further high-frequency data signal $f_S$ is transmitted, which serves to convert the frequency and/or to modulate the carrier code of the high-frequency data signal $f_C$.

18 Claims, 3 Drawing Sheets

1 Antenna
2 Filter
3 Amplifier
8 Filter
11 Amplifier
12 Detector
13 Data Shaper
14 Micro controller
15a Filter
15b Filter
16a Amplifier
16b Amplifier
17 Mixer

METHOD AND CIRCUIT FOR TRANSMITTING A DATA-MODULATED HIGH-FREQUENCY DATA SIGNAL FROM A TRANSMITTER TO A RECEIVER HAVING A SIMPLIFIED RECEIVER ARCHITECTURE This is a Continuation of International Application PCT/DE00/04398, with an international filing date of Dec. 11, 2000, which was published under PCT Article 21(2) in German, and the disclosure of which is incorporated into this application by reference.

FIELD OF AND BACKGROUND OF THE INVENTION

The invention relates to a method for transmitting a data-modulated high-frequency data signal from a transmitter to a receiver having a simplified receiver architecture, and to a circuit, identification system and overall system utilizing such a method.

Circuits for transmitting a data-modulated high-frequency data signal from a transmitter to a receiver in which an oscillator and a PLL synthesizer are provided to shift the received high-frequency data signal to a lower frequency band for further processing are known in the art. Such circuits have a complex structure and their power consumption is high. They are therefore not suitable for mobile data memories, e.g., those used for transmitting data between a read/write device and at least one mobile data memory in an identification system having a plurality of mobile data memories which are attached to objects and which are provided for detecting object-related status and/or process data of the individual objects, e.g., in a shipping, transport and/or manufacturing system.

OBJECTS OF THE INVENTION

One object of the invention is to provide a circuit for transmitting a data-modulated high-frequency data signal from a transmitter to a receiver, in which the receiver has a simpler structure and consumes less power than is the case in conventional devices. Another object is to provide a method for operating such a circuit.

SUMMARY OF THE INVENTION

With respect to the method, according to one formulation of the invention, this and other objects are attained by: transmitting a data-modulated high-frequency data signal $f_C$ in a given band range; transmitting an additional high-frequency data signal $f_S$ together with the high-frequency data signal $f_C$ in a band range different from the given band range; amplifying the high-frequency data signals $f_C$ and $f_S$; mixing the high-frequency data signals $f_C$ and $f_S$ to generate a data-modulated intermediate-frequency data signal $f_{IF}$; and data modulating the intermediate frequency data signal $f_{IF}$. For the circuit, according to a further formulation of the invention, this and other objects are attained by: an antenna receiving both a high-frequency data signal $f_C$ and an additional high-frequency data signal $f_S$; amplifiers amplifying, respectively, the high-frequency data signals $f_C$ and $f_S$; and a mixer mixing the high-frequency data signals $f_C$ and $f_S$, to generate a data-modulated intermediate-frequency data signal $f_{IF}$.

The method, according to the invention as defined above, provides that, in addition to the data-modulated high-frequency data signal, another high-frequency data signal is transmitted, which serves for frequency shifting and/or carrier code demodulation. Thus, it is no longer necessary to generate separate signals in the receiver for this purpose, and the corresponding receiver components are eliminated, including, e.g., the PLL synthesizer and the oscillator.

After amplification of the two high-frequency data signals, the signals are mixed and a data-modulated intermediate frequency data signal is generated and subsequently data-demodulated.

To increase the interference immunity of the receiver of the data-modulated high-frequency data signal, this signal can also be provided with a carrier code, e.g., a spread spectrum code. In this case it can be advantageous to separate the two transmitted high-frequency data signals prior to amplification and, if necessary, to amplify them differently.

In both variants of the method—with or without separation prior to amplification—the two high-frequency data signals may be mixed in a mixer in which the frequencies are converted and correlated.

In the circuit according to the above formulation of the invention, first an antenna is provided for jointly receiving the data-modulated high-frequency data signal as well as the additional high-frequency data signal. Further, an amplifier is used to amplify each of the two high-frequency data signals and a mixer unit to mix the high-frequency data signals to generate an intermediate-frequency data signal.

If the two high-frequency data signals are separated after having been received together and prior to further processing (e.g., if the high-frequency data signal is carrier-code modulated), this separation can be carried out in a filter unit, e.g., a diplexer filter.

The mixer unit for mixing the high-frequency data signals after reception and amplification to generate a data-modulated intermediate-frequency data signal, can be configured as a frequency converter/correlator mixer.

BRIEF DESCRIPTION OF THE DRAWINGS

The invention will now be described in greater detail by means of exemplary embodiments with reference to the drawing figures in which.

DETAILED DESCRIPTION OF THE PREFERRED EMBODIMENTS

Figure 1:
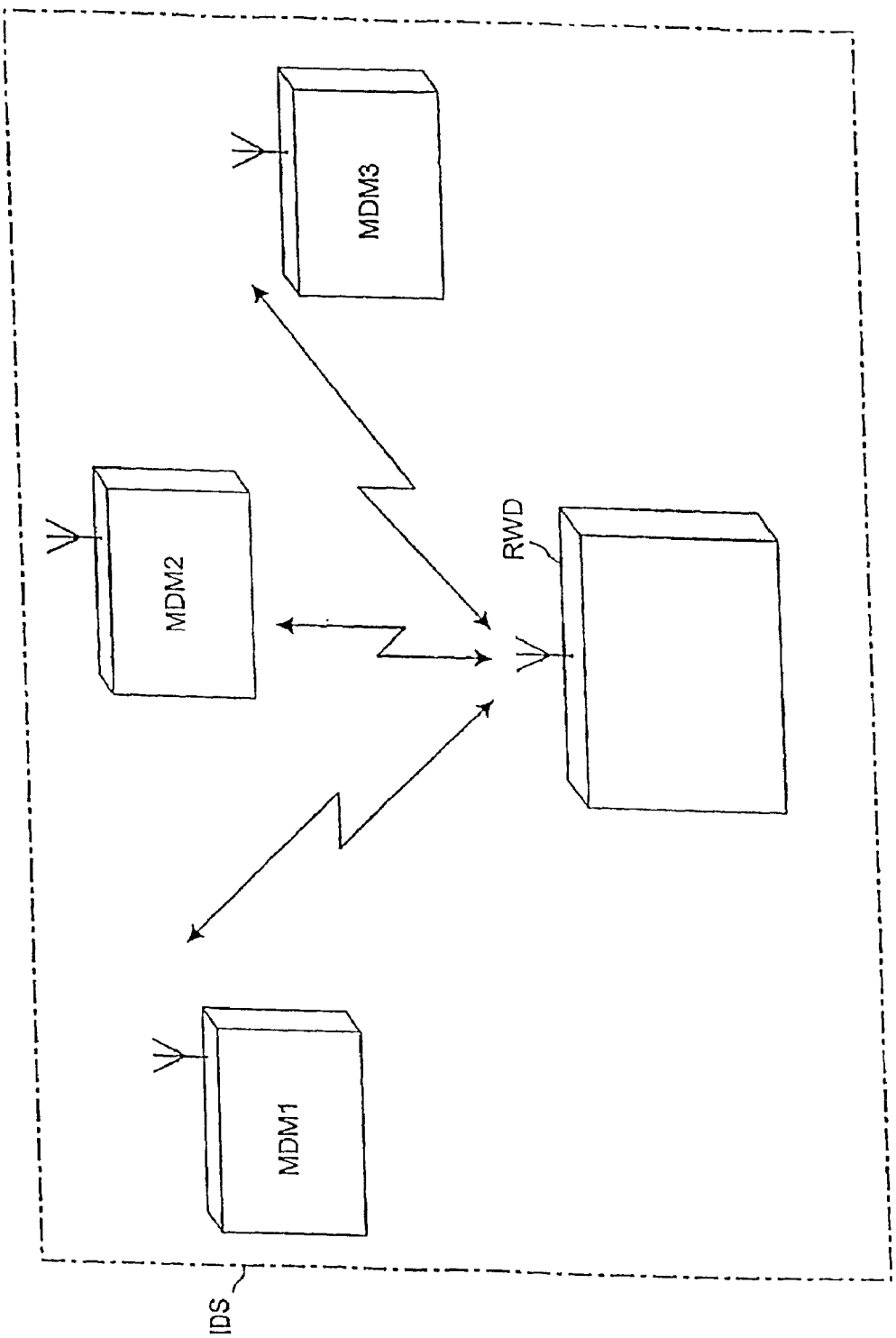
FIG. 1 is a schematic representation of a read/write device with mobile data memories located at respective distances from the read/write device.

FIG. 1 shows an identification system IDS that includes mobile data memories (MDM 1-3) arranged at various locations, and possibly moving, relative to a read/write device (RWD). The mobile data memories (MDM) communicate with the read/write device (RWD), preferably via radio signals, for the purpose of transferring data at least from the mobile data memories (MDM) to the read/write device (RWD).

Figure 2:
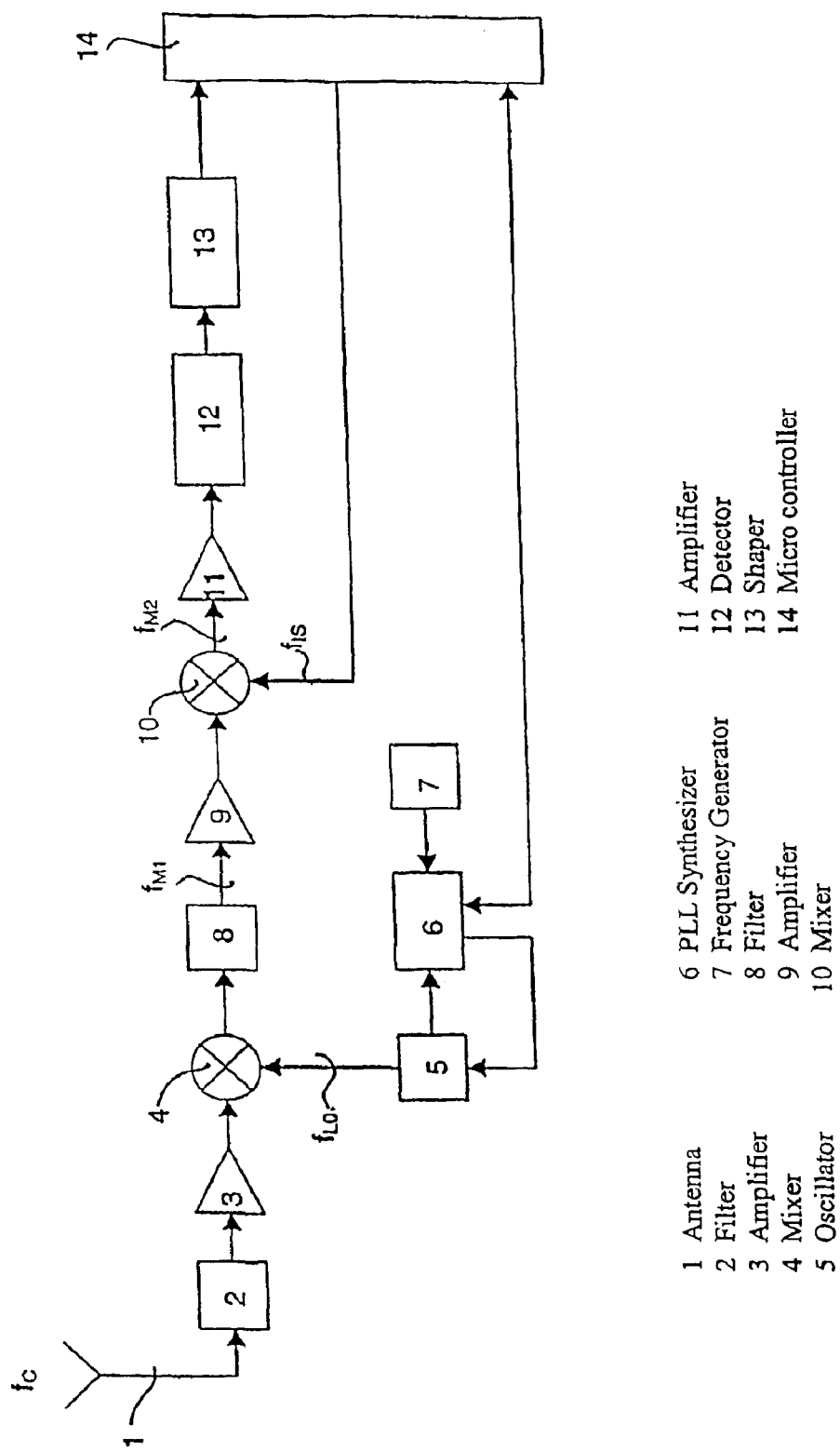
FIG. 2 shows a circuit of a prior art receiver.

FIG. 2 depicts a circuit of a prior art receiver for receiving a data-modulated high-frequency data signal $f_C$ (signal $f_C$), which is received via an antenna 1 and then first passes through a filter 2 to suppress off-band interfering signals (wide-up filter). After passing through an amplifier 3, signal $f_C$ enters a mixer 4 to which a data signal $f_{LO}$ (signal $f_{LO}$) of the local (receiver-internal) oscillator 5 is also supplied.

Signal $f_{LO}$ is generated in a manner known in the art by way of a phase-locked loop (PLL) by the interaction of the oscillator 5, preferably a voltage-controlled oscillator (VCO), a PLL synthesizer 6 and a frequency generator 7, controlled and monitored by a microcontroller 14.

Following mixer 4, the frequency of signal $f_C$ is converted and reduced.

Specifically, at the output of mixer 4, there is produced both a frequency sum $f_C+f_{LO}$ and a frequency difference $f_C-f_{LO}$. The frequency sum is suppressed by a filter 8, which is an intermediate-frequency filter functioning as a channel filter. This produces a mixer signal $f_{M1}$ with a new intermediate frequency, namely of the frequency difference $f_C-f_{LO}$. This intermediate frequency is then amplified in an amplifier 9 and mixed in a mixer 10 with an internal key signal $f_{IS}$ (signal $f_{IS}$) to eliminate frequency spreading if the high-frequency data signal $f_C$ was modulated with a carrier code (e.g., a spread spectrum code). The signal $f_{IS}$, together with the internal key frequency, is provided by the microcontroller 14.

Following the mixer 10, the unspread mixer signal $f_{M2}$ passes through an amplifier 11, a detector 12, and a data shaper 13, to then be data demodulated and further processed in the microcontroller 14.

Figure 3:
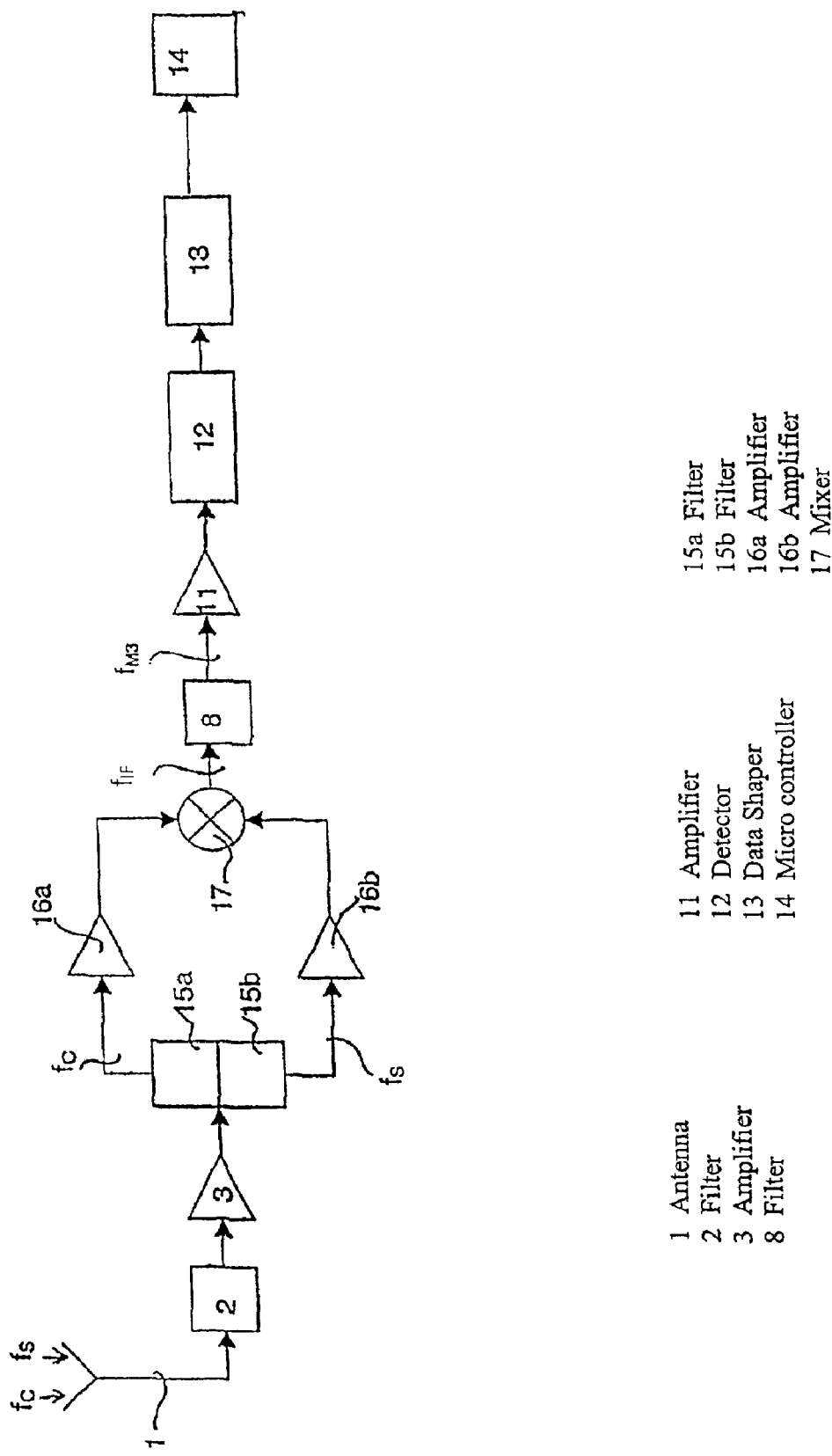
FIG. 3 shows a circuit according to the invention with simplified receiver architecture.

FIG. 3 is a schematic representation of an inventive circuit of a receiver for receiving a data-modulated high-frequency data signal $f_C$ (signal $f_C$) from a transmitter. In addition to signal $f_C$, another high-frequency data signal $f_S$ (signal $f_S$) is received via antenna 1. The two signals $f_C$ and $f_S$ pass through a filter 2 to suppress off-band interference signals (wide-up filter) and an amplifier 3.

Particularly if the high-frequency data signal $f_C$ is also carrier-code modulated, e.g., as a spread spectrum signal, carrier bandpass filters 15a, 15b are provided for separating signals $f_C$ and $f_S$. Signal $f_C$ is amplified in a carrier band amplifier 16a and signal $f_S$ in a carrier band amplifier 16b. The separately amplified signals are then again supplied to a mixer 17 in which signal $f_S$ is used to convert the frequency and demodulate the carrier code of signal $f_C$.

At the output of the mixer 17, both the frequency sum $f_C+f_S$ and the frequency difference $f_C-f_S$ occur; the frequency sum is suppressed by the intermediate-frequency filter 8. Thus, a mixer signal $f_{M3}$ (signal $f_{M3}$), which is in an intermediate frequency position below the frequency of signal $f_C$, leaves the intermediate frequency filter 8, while at the same time eliminating the carrier code modulation of data signal $f_C$ ("unspreading").

Signal $f_{M3}$ is data-demodulated in amplifier 11, detector 12, and data shaper 13 in the manner described with reference to FIG. 2 and is supplied to microcontroller 14 for further processing.

If signal $f_C$ is not carrier-code modulated, it is not necessary to separate the signals $f_C$ and $f_S$ in carrier band filters 15a, 15b and amplify them separately in carrier band amplifiers 16a, 16b. In this case, the two data signals $f_C$ and $f_S$, after passing through the amplifier 3, can be amplified together and supplied to the mixer 17.

External signal $f_S$, which is transmitted together with the signal $f_C$, is thus used to convert the frequency of data signal $f_C$ into the intermediate frequency position and/or to unspread the data signal $f_C$ in the circuit, as shown in FIG. 3.

The inventive circuit according to FIG. 3, in contrast to the prior art circuit, requires neither an internal signal $f_S$ for carrier-code modulation of signal $f_C$ nor an internal signal $f_{LO}$ in the receiver. Consequently, the circuit according to FIG. 3 has a simpler configuration and consumes less power.

The above description of the preferred embodiments has been given by way of example. From the disclosure given, those skilled in the art will not only understand the present invention and its attendant advantages, but will also find apparent various changes and modifications to the methods and structures disclosed. It is sought, therefore, to cover all such changes and modifications as fall within the spirit and scope of the invention, as defined by the appended claims, and equivalents thereof.

What is claimed is:

1. Method, comprising:
   transmitting a data-modulated high-frequency data signal $f_C$ in a given band range;
   transmitting an additional high-frequency data signal $f_S$ together with the high-frequency data signal $f_C$ in a band range different from the given band range;
   amplifying the high-frequency data signals $f_C$ and $f_S$;
   mixing the high-frequency data signals $f_C$ and $f_s$ to generate a data-modulated intermediate-frequency data signal $f_{IF}$; and
   data modulating the intermediate frequency data signal $f_{IF}$.

2. The method according to claim 1, wherein the data-modulated high-frequency data signal $f_C$ is also carrier-code modulated.

3. The method as claimed in claim 2, further comprising:
   separating the high-frequency data signals $f_C$ and $f_S$ subsequent to said transmitting of the additional high-frequency data signal $f_S$.

4. The method as claimed in claim 3, wherein the high-frequency data signals $f_C$ and $f_S$ are separated in a filter.

5. The method as claimed in claim 2, wherein the high-frequency data signals $f_C$ and $f_S$ are mutually differently amplified.

6. The method as claimed in claim 2, further comprising:
   decoding the high-frequency data signal $f_C$ using the additional high-frequency data signal $f_S$.

7. The method as claimed in claim 1, wherein said mixing additionally converts and correlates the frequencies of the high-frequency data signals $f_C$ and $f_S$.

8. A circuit, comprising:
   an antenna receiving both a high-frequency data signal $f_C$ and an additional high-frequency data signal $f_S$;
   amplifiers amplifying, respectively, the high-frequency data signals $f_C$ and $f_S$; and
   a mixer mixing the high-frequency data signals $f_C$ and $f_S$, to generate a data-modulated intermediate-frequency data signal $f_{IF}$.

9. The circuit as claimed in claim 8, further comprising:
   a filter unit separating the high-frequency data signals $f_C$ and $f_S$.

10. The circuit as claimed in claim 9, wherein the filter unit is a diplexer filter.

11. The circuit as claimed in claim 8, wherein the mixer is a frequency converter and correlator mixer.

12. An identification system, comprising:
    at least one transmitter transmitting a high-frequency data signal $f_C$ and an additional high-frequency data signal $f_S$;
    at least one antenna receiving both the high-frequency data signal $f_C$ and the additional high-frequency data signal $f_S$;
    at least one amplifier amplifying both the high-frequency data signal $f_C$ and the additional high-frequency data signal $f_S$ a filter unit separating the high-frequency data signal $f_C$ and the additional high-frequency data signal $f_S$, and a mixer mixing the amplified high-frequency data signal $f_C$ and the additional high-frequency data signal $f_S$ and outputting a data-modulated intermediate-frequency data signal $f_{IF}$.

13. The system as claimed in claim 12, wherein the filter unit comprises a diplexer filter.

14. The system as claimed in claim 12, wherein the mixer comprises a frequency converter and correlator mixer.

15. A system, comprising:

a read/write device;

at least one data memory attached to an object and storing data regarding the object;

at least one transmitter transmitting a high-frequency data signal $f_C$ and an additional high-frequency data signal $f_S$;

at least one antenna receiving both the high-frequency data signal $f_C$ and the additional high-frequency data signal $f_S$;

at least one amplifier amplifying both the high-frequency data signal $f_C$ and the additional high-frequency data signal $f_S$; and a mixer mixing the amplified high-frequency data signal $f_C$ and the additional high-frequency data signal $f_S$ and outputting a data-modulated intermediate-frequency data signal $f_{IF}$.

16. The system as claimed in claim 15, wherein the data includes at least one of status and process data of the object.

17. The system as claimed in claim 15, wherein the system is at least one of a shipping system, a transport system and a production system.

18. The system as claimed in claim 15, wherein the transmitter is associated with the data memory and the high-frequency data signal $f_C$ comprises the stored data regarding the object.

* * * * *